(12) United States Patent
Weinmann et al.

(10) Patent No.: US 8,779,944 B2
(45) Date of Patent: Jul. 15, 2014

(54) OPTICAL IMAGE MONITORING SYSTEM AND METHOD FOR VEHICLES

(71) Applicants: Robert V. Weinmann, Wahpeton, ND (US); Joshua N. Gelinske, Fargo, ND (US); Robert M. Allen, Reiles Acres, ND (US); Johan A. Wiig, Paris (FR)

(72) Inventors: Robert V. Weinmann, Wahpeton, ND (US); Joshua N. Gelinske, Fargo, ND (US); Robert M. Allen, Reiles Acres, ND (US); Johan A. Wiig, Paris (FR)

(73) Assignee: Appareo Systems, LLC, Fargo, ND (US)

( * ) Notice: Subject to any disclaimer, the term of this patent is extended or adjusted under 35 U.S.C. 154(b) by 0 days.

(21) Appl. No.: 13/686,658

(22) Filed: Nov. 27, 2012

(65) Prior Publication Data

US 2013/0085638 A1 Apr. 4, 2013

Related U.S. Application Data

(63) Continuation of application No. 12/539,835, filed on Aug. 12, 2009, now Pat. No. 8,319,666, which is a continuation-in-part of application No. 12/390,146, filed on Feb. 20, 2009, now Pat. No. 8,319,665.

(51) Int. Cl.
*G08B 21/00* (2006.01)

(52) U.S. Cl.
USPC ............ 340/945; 340/937; 340/971; 340/438

(58) Field of Classification Search
USPC ......... 340/438, 937, 945, 947, 955, 956, 963, 340/964, 971, 973, 974, 978, 982; 348/117, 348/143, 148; 382/209, 217; 702/152, 158
See application file for complete search history.

(56) References Cited

U.S. PATENT DOCUMENTS

| 3,732,366 | A | 5/1973 | Bolie |
|---|---|---|---|
| 4,430,750 | A | 2/1984 | Koellensperger |
| 4,499,595 | A | 2/1985 | Masaitis et al. |
| 4,547,701 | A | 10/1985 | Taylor et al. |
| 4,707,647 | A | 11/1987 | Coldren et al. |
| 5,283,643 | A | 2/1994 | Fujimoto |
| 5,606,365 | A | 2/1997 | Maurinus et al. |
| 5,974,158 | A | 10/1999 | Auty et al. |
| 6,111,242 | A | 8/2000 | Afghahi |
| 6,216,065 | B1 | 4/2001 | Hall et al. |
| 6,553,131 | B1 | 4/2003 | Neubauer et al. |
| 6,597,406 | B2 | 7/2003 | Gloudemans et al. |
| 6,643,401 | B1 | 11/2003 | Kashioka et al. |

(Continued)

FOREIGN PATENT DOCUMENTS

| CA | 2481176 | 3/2005 |
|---|---|---|
| CA | 2517045 | 2/2006 |

(Continued)

OTHER PUBLICATIONS

"Optical Gauge Recognition", *Problem: Light & Legacy Aircraft Lack Maintenance Monitoring Equipment*, Feb. 00, 2009.

*Primary Examiner* — Van T. Trieu
(74) *Attorney, Agent, or Firm* — Jonathan Tolstedt; Mark Brown

(57) ABSTRACT

A system and method of acquiring information from an image of a vehicle in real time wherein at least one imaging device with advanced light metering capabilities is placed aboard a vehicle, a computer processor means is provided to control the imaging device and the advanced light metering capabilities, the advanced light metering capabilities are used to capture an image of at least a portion of the vehicle, and image recognition algorithms are used to identify the current state or position of the corresponding portion of the vehicle.

16 Claims, 14 Drawing Sheets

(56) References Cited

U.S. PATENT DOCUMENTS

| | | |
|---|---|---|
| 6,754,368 B1 | 6/2004 | Cohen |
| 6,954,228 B1 | 10/2005 | Acharya et al. |
| 7,066,391 B2 | 6/2006 | Tsikos et al. |
| 7,400,950 B2 | 7/2008 | Reich |
| 7,414,544 B2 | 8/2008 | Oltheten et al. |
| 7,447,362 B2 | 11/2008 | Lev |
| 7,477,780 B2 | 1/2009 | Boncyk et al. |
| 7,505,604 B2 | 3/2009 | Zakrzewski et al. |
| 7,551,783 B2 | 6/2009 | Johnson et al. |
| 7,616,811 B2 | 11/2009 | Kalevo et al. |
| 7,873,494 B2 | 1/2011 | Hadley et al. |
| 2004/0186636 A1 | 9/2004 | Mendelson et al. |
| 2005/0074183 A1 | 4/2005 | Narlow |
| 2006/0228102 A1 | 10/2006 | Yang et al. |
| 2007/0146689 A1 | 6/2007 | Araki et al. |
| 2007/0236366 A1 | 10/2007 | Gur et al. |
| 2008/0056535 A1 | 3/2008 | Bergmann et al. |
| 2009/0201315 A1 | 8/2009 | Nishida |
| 2011/0001796 A1 | 1/2011 | Werjefelt et al. |

FOREIGN PATENT DOCUMENTS

| | | |
|---|---|---|
| CA | 2606033 | 4/2008 |
| CN | 1627317 | 6/2005 |
| EP | 1085455 | 8/2006 |
| GB | 2428325 | 8/2007 |
| WO | WO-2009026156 | 2/2009 |

OPTICAL IMAGE MONITORING SYSTEM AND METHOD FOR VEHICLES

CROSS-REFERENCE TO RELATED APPLICATION

This application is a continuation of and claims the benefit of U.S. patent application Ser. No. 12/539,835, filed Aug. 12, 2009, now U.S. Pat. No. 8,319,666, issued Nov. 27, 2012, which is a continuation-in-part of and claims the benefit of U.S. patent application Ser. No. 12/390,146, filed Feb. 20, 2009, now U.S. Pat. No. 8,319,665, issued Nov. 27, 2012, which are all incorporated herein by reference.

BACKGROUND OF THE INVENTION

1. Field of the Invention

This invention relates to the field of optical feature recognition, and more particularly to a system and method for automatically interpreting and analyzing gauges, readouts, the position and state of user controls, and the exterior of a vehicle, such as an aircraft, including the position and state of flight control surfaces, in an environment with highly dynamic lighting conditions.

2. Description of the Related Art

The recording and automated analysis of image data is well known in the prior art. For example, optical character recognition, or OCR, is the process of analyzing an image of a document and converting the printed text found therein into machine-editable text. OCR programs are readily available and often distributed for free with computer scanners and word editing programs. OCR is a relatively simple task for modern software systems, as documents are typically presented with known lighting conditions (that is, an image of dark text on a light background, captured with the consistent, bright exposure light of a document scanning system) using predetermined character sets (that is, known and readily-available character fonts).

Systems attempting to recognize handwritten text have the added challenge of handling the variations in personal handwriting styles from one person to the next. Still, these systems often require that the writers print the text instead of using cursive and that they follow certain guidelines when creating their printed characters. Even in these systems, where the individual style variations must be accounted for, the lighting conditions used to capture the text images are well-controlled and consistent.

Another example of automated image analysis is facial recognition. A facial recognition system is a computer application for automatically identifying a person from a digital image of the person's face. Facial recognition programs are useful in security scenarios, such as analyzing passengers boarding an aircraft in an attempt to identify known terrorists. A typical facial recognition program works by comparing selected facial features from the image, such as the distance between the person's eyes or the length of the nose, against a facial feature database. As with optical character recognition, facial recognition works best in controlled lighting conditions when the subject matter (that is, the face) is in a known orientation relative to the image.

It is also common to use video cameras in the cockpit of an aircraft or cab of a land-based, marine or other vehicle as a means of gathering data. In the event of an incident, such as a crash or near-miss, the recorded video can be post-processed (that is, processed by experts and systems off-board the vehicle, after the image data has been downloaded to an external system) to determine what conditions were present in the vehicle during the incident. Storing the video data on board the vehicle requires a large amount of storage space. Because of this, mechanisms are often used to limit the amount of storage required on board the vehicle, such as only storing the most recent video data (for example, only storing the most recent 10 minutes of data, and overwriting anything older than this.)

Cameras can also be mounted to the exterior surface of a vehicle to capture images while the vehicle is in motion. Image and video data of the vehicle's exterior surface, including the position and state of the vehicle's control surfaces and lights, can be relayed to a monitor near the operator of the vehicle. This image data can be recorded in the same manner that image data is recorded from the cockpit or cab of the vehicle, as previously described. The external image data thus captured is subject to the same storage and quality limitations inherent in the storage of image data from the interior of the vehicle.

The ambient lighting conditions of both the interior and exterior of a vehicle are highly dynamic, and vary based on the time of day, the angle of the vehicle in relation to the sun, and on the presence of other external sources of illumination. One portion of an instrument panel or vehicle control surface may be concealed in shadow, while another portion is bathed in direct sunlight. The dividing line between dark and light constantly changes as the vehicle maneuvers and changes position in relation to the sun. Commercially available camera systems for use in vehicles do not perform well in these conditions, and provide low-quality images. These limitations make the task of post-processing the image data to clearly identify details within the images difficult if not impossible.

A single clear image of an aircraft cockpit, however, would contain a wealth of information about the ongoing flight. An image of a cockpit would capture a snapshot of the current state of each of the flight instruments, the position of the pilot and copilot, and the presence of any unusual conditions (such as smoke) for any given moment in time.

Similarly, a clear image of the exterior surfaces of an aircraft or vehicle would capture the current state of items such as control surfaces (rudder, elevator, ailerons, flaps, landing gear, etc.), vehicle lights (headlights, turn signals, etc.), and other vehicle components (doors, windows, wings, etc.).

If automatic image analysis of this image data could be consistently performed in real time, while the trip is in progress, this visual information could be interpreted and stored as numeric data and/or communicated to the operator and/or other onboard systems. Further, if this image data could be captured by a self-contained camera module with built-in processing capabilities, the ability to process and analyze interior and exterior image data could be added to any vehicle, regardless if that vehicle had its own onboard computer or sensing systems. This stand-alone camera module could capture the image data while the trip was in progress, analyze the image data and convert it to numeric data, and then compare that numeric data to pre-existing data, such as a flight plan or terrain model, already contained in the camera module.

What is needed in the art is an imaging system which can, in real time, capture high quality images of an aircraft or vehicle or portions thereof, compensate for the dynamic lighting conditions that can be present, analyze the image data and translate it into numeric data, and provide information and/or advisories to the operators and other onboard systems. This system should also incorporate other information and capabilities such that it is aware of its own position and orientation in three-dimensional space and such that it can operate as a stand-alone unit, without the need to be tied into other onboard vehicle systems.

SUMMARY OF THE INVENTION

According to one aspect of the present invention, a method of acquiring information from an image of a vehicle in real time is provided, comprising the steps of providing at least one imaging device with advanced light metering capabilities aboard the vehicle, providing a control means to control the imaging device and advanced light metering capabilities, using the advanced light metering capabilities to capture an image of a portion of the vehicle, and using image recognition algorithms to identify the current state or position of the corresponding portion of the vehicle.

According to another aspect of the present invention, a system for acquiring information from an image of a vehicle in real time is provided, comprising a software-controlled imaging device with advanced light metering capabilities, a control means for controlling the imaging device and advanced light metering capabilities, a memory module, a GNSS receiver, and an inertial measurement unit. The control means uses the advanced light metering capabilities to capture an image of a portion of the vehicle and processes the image to extract information pertaining to the status of the vehicle.

According to yet another aspect of the present invention, a software-based rules engine is used to analyze the status information extracted from the image of the vehicle in real time to determine if any of a set of pre-determined rules has been violated, and to initiate an appropriate response if a rule has been violated.

These aspects and others are achieved by the present invention, which is described in detail in the following specification and accompanying drawings which form a part hereof.

BRIEF DESCRIPTION OF THE DRAWINGS

FIG. 7C shows how certain areas of a gauge image may be masked off so that only the immediate area of interest can be focused on.

DETAILED DESCRIPTION OF THE PREFERRED EMBODIMENT

With reference now to the drawings, and in particular to FIGS. 1 through 12 thereof, a new adaptive feature recognition process and device embodying the principles and concepts of the present invention will be described.

Figure 1:
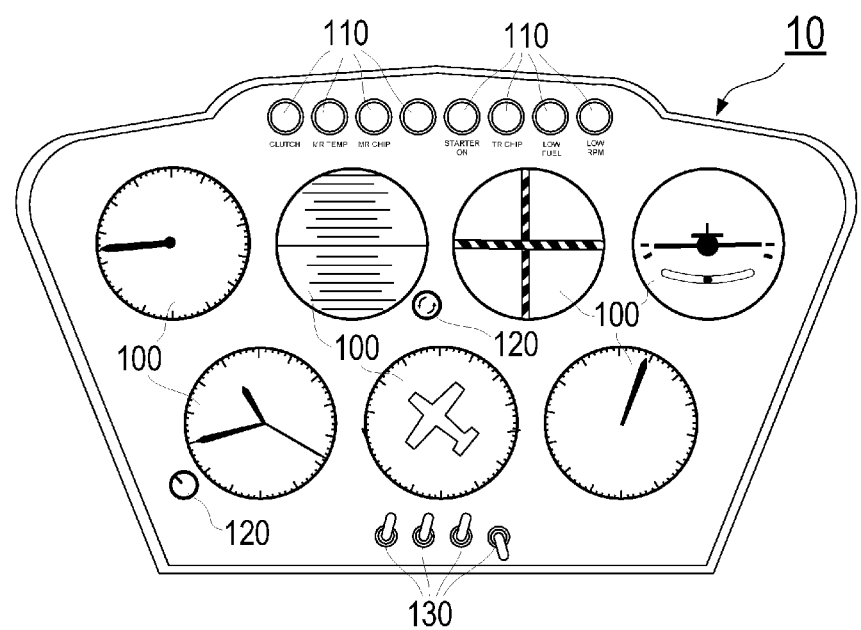
FIG. 1 is a front view of a representative instrument panel.

FIG. 1 is a front view of a representative instrument panel 10. For the purposes of this discussion, an "instrument panel" shall be defined as a fixed arrangement of gauges, lights, digital readouts, displays, and user controls as might be seen in the cab of a vehicle, such as a car or truck, or in the cockpit of an aircraft. The depiction of the instrument panel 10 in FIG. 1 is meant to be illustrative of the type and style of features as might be seen in any type of vehicle, and not meant to be limiting in any way. The features shown in FIG. 1 are suggestive of those that might be seen on an aircraft such as a helicopter, but the present invention will work equally well on any type of instruments in any type of vehicle. In addition, for the purposes of this discussion, any gauge, display, operator control, or input device that is located in the vehicle cab or aircraft cockpit, and which can be detected and captured in an image, will be considered to be a part of the instrument panel, even if it is not physically attached to other features in the cab or cockpit. For example, the position of the flight yoke used by the operator of the aircraft can be captured in an image of the cockpit, and will be considered to be part of the instrument panel as defined herein.

An instrument panel 10 offers a user interface to the operator of a vehicle. Information may be presented to the operator in the form of gauges 100, which provide data as to the operating status of various vehicle systems. These gauges 100 are typically mechanical in nature (for example, a mechanical fuel gauge with a needle indicating the level of fuel in the fuel tank), incapable of storing the information they present long-term, and only provide an instantaneous snapshot of the systems they are monitoring. An instrument panel 10 may also use one or more status lights 110 to indicate the presence or absence of a condition. For example, a "low fuel" light may illuminate when the amount of fuel in the fuel tank has reached a pre-set lower limit.

Alternative embodiments of an instrument panel may exist which offer features for presenting information to the operator other than those shown in FIG. 1. As one example, an alternative embodiment of an instrument panel may include digital readouts which provide numeric information to the operator instead of offering the information in the form of a gauge. It is obvious to one skilled in the art that any feature that provides information to an operator in the form of a visible indication that can be detected in an image or visually by the operator could be used with the present invention.

In addition to providing information to the operator, an instrument panel 10 may offer one or more operator controls by which an operator can provide input or control a feature of the vehicle. For example, an instrument panel 10 may offer one or more rotary knobs 120 as a means of adjusting or calibrating one of the gauges 100. Functional switches 130 may also be offered to allow the operator to enable and disable vehicle functions.

Alternative embodiments of an instrument panel may exist which offer features for operator input other than those shown in FIG. 1. For example, an alternative embodiment of an instrument panel may include a lever, slide, or a multi-position switch. It is obvious to one skilled in the art that any feature through which an operator can input control information into the vehicle or instrument panel, and for which the position or status can be detected visually in an image or by the operator could be used with the present invention.

Figure 2:
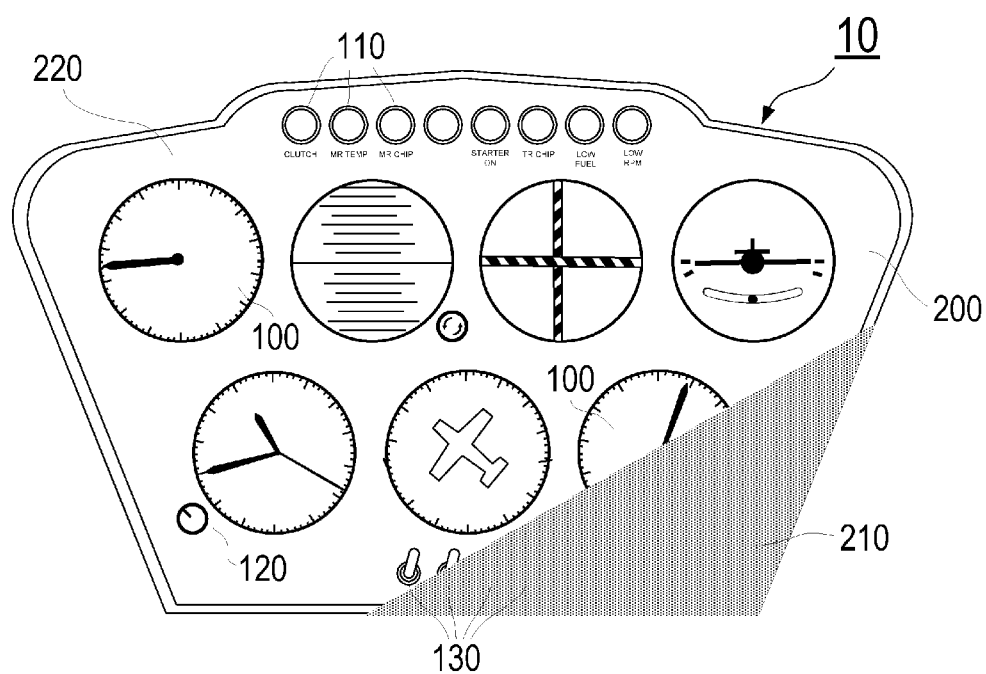
FIG. 2 is a front view of a representative instrument panel as it might appear to an imaging device when different areas of the panel are exposed to different lighting conditions.

FIG. 2 is a front view of the representative instrument panel 10 of FIG. 1 as it might appear to an operator or imaging device when different areas of the panel are exposed to different lighting conditions. As a vehicle moves, the instrument panel 10 is exposed to various lighting conditions depending on many factors, including the angle of the vehicle in relation to the sun, the time of day, and the presence of other external sources of illumination. Portions of the instrument panel 10 may be bathed in bright light 200, while other portions of the instrument panel 10 may be obscured by light shadow 210 or dark shadow 220. The boundaries between the areas of bright light 200, light shadow 210, and dark shadow 220 are constantly changing. It is likely that these boundaries between lighting conditions may at some point fall across the face of one or more gauges 100, status lights 110, rotary knobs 120, or functional switches 130, or any other type of feature that may be present on the instrument panel 10. These dynamic lighting conditions make it difficult for imaging devices to produce clear, readable images of the instrument panel 10 and its features.

Figure 3:
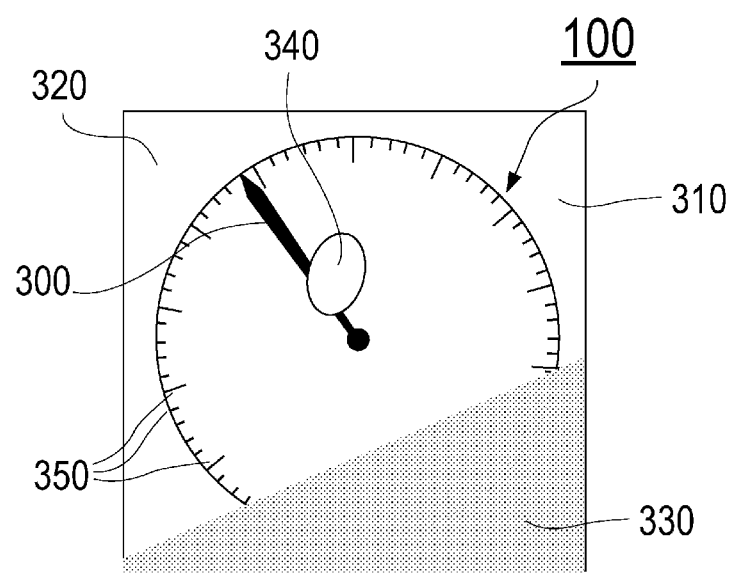
FIG. 3 is a front view of a single gauge showing areas of different lighting conditions and specular highlights.

FIG. 3 is a front view of a single gauge 100 showing areas of different lighting conditions and specular highlights. A typical gauge 100 presents information to the operator through the use of a needle 300. The position of the needle 300 against a graduated scale of tick marks 350 or other indicia provide status information, such as the current airspeed or altitude, to the operator. Just as the instrument panel 10 is subject to the presences of dynamic lighting conditions, as shown in FIG. 2, a single gauge 100 may itself be subject to these varying conditions. While one portion of the gauge 100 is in bright light 310, other portions may be in light shadow 330 or dark shadow 320. As a gauge 100 typically has a glass or clear plastic faceplate, the face of the gauge 100 may also be subject to the presence of one or more specular highlights 340. A specular highlight 340 is a bright spot of light that appears on a glossy surface, the result of the reflection of an external source of light. This specular highlight 340 may obscure at least a portion of the needle 300 or the tick marks 350, which can be a significant obstacle for image processing.

The use of a gauge 100 featuring a needle 300 and tick marks 350 in FIG. 3 is meant to be illustrative and should not be construed as limiting in any way. Any other appropriate type of gauge, such as a compass featuring the graphic of an aircraft rotating to show the true heading of the actual aircraft instead of a needle, may be subject to these localized dynamic lighting effects and applicable to the present invention. In addition, other features presenting information to the operator (such as status lights, digital readouts, or computer displays) or operator controls receiving input from an operator (such as levers, knobs, switches, and pushbuttons) would be affected by the localized dynamic lighting as described herein.

Figure 4A:
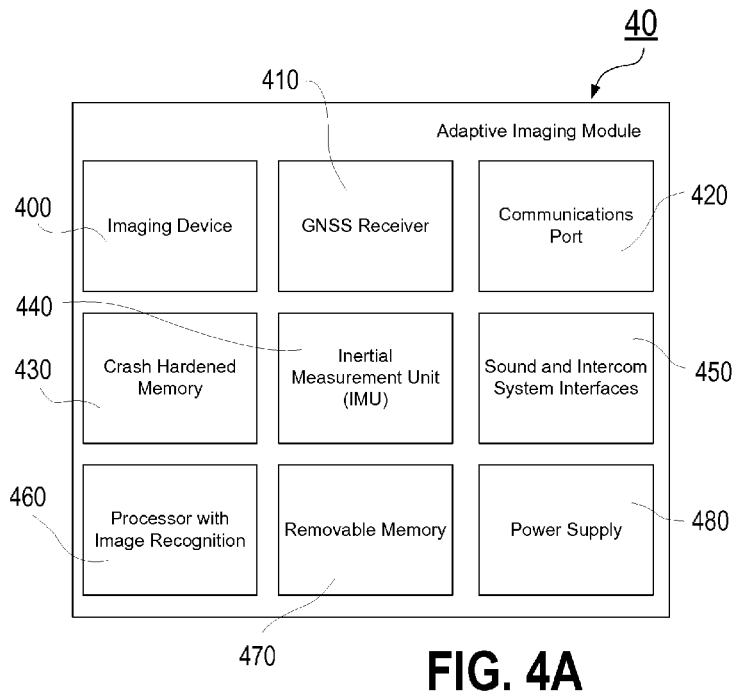
FIG. 4A is a high-level block diagram of one embodiment of an adaptive imaging module that could be used to capture and process images of a portion of a vehicle.

FIG. 4A is a high-level block diagram of one embodiment of an adaptive imaging module 40 that could be used to capture and process images of an instrument panel 10 such as the one shown in FIG. 1 and FIG. 2. In the preferred embodiment, the adaptive imaging module 40 includes an imaging device 400, such as a CCD camera or CMOS camera or any other appropriate imaging system. The imaging device 400 is used to acquire images of all or part of the instrument panel 10, a process that is further described in FIGS. 6B, 8, and 9. Additional detail on the components of the imaging device 400 itself is also provided in FIG. 4B. Integrated into the adaptive imaging module 40 along with the imaging device 400 are a Global Navigation Satellite System (GNSS) receiver 410 and an inertial measurement unit (IMU) 440. GNSS is the generic term for satellite navigation systems that provide autonomous geo-spatial positioning with global coverage, an example of which is the Global Positioning System (GPS) developed by the United States Department of Defense. The GNSS receiver 410 receives signals from an appropriate satellite system and calculates the precise position of the adaptive imaging module 40 in three-dimensional space (latitude, longitude, and altitude). An IMU is a device used for sensing the motion—including the type, rate, and direction of that motion—of an object in three-dimensional space. An IMU typically includes a combination of accelerometers and gyroscopes to sense the magnitude and rate of an object's movement through space. The output of the IMU 440 and the GNSS receiver 410 are combined in the adaptive imaging module 40 to calculate the precise location and orientation of the adaptive imaging module 40 in three-dimensional space. This location/orientation information can be paired with specific images captured by the imaging device 400 to create a record of where a vehicle was located in space when a specific image was captured.

The adaptive imaging module 40 contains a processor 460 which performs all image recognition and control functions for the adaptive imaging module 40. The processor 460 has sufficient computing power and speed, at a minimum, to perform the set-up functions described in the flowchart of FIG. 6B, to perform the image acquisition functions described in the flowchart of FIG. 8, to perform the image processing functions described in the flowchart of FIG. 9, to perform the flight operations functions described in the flowchart of FIG. 10, and to perform all power management, input/output, and memory management functions required by the adaptive imaging module 40.

Data acquired during a trip, including but not limited to image and video data, position and orientation data, sound and intercom system data, and other miscellaneous trip parameters, is stored inside the adaptive imaging module 40 in a memory module 430 which is optionally hardened to allow survivability in the event of a vehicle crash. Such a crash-hardened memory module is disclosed in U.S. Pat. No. 7,616,449 for Crash-Hardened Memory Device and Method of Creating the Same, which is assigned to a common assignee herewith and is incorporated herein by reference. An optional removable memory device 470 provides back up for the memory module 430 as well as a means of transferring data from the adaptive imaging module 40 to an off-board system (not shown and not part of this invention). The removable memory device 470 may be any appropriate portable memory media, including but not limited to SD or MMC memory cards, portable flash memory, or PCMCIA cards.

The preferred embodiment of the adaptive imaging module 40 also contains a communications port 420 that can be used as an alternative means for transferring data to an off-board system or as a means of uploading firmware updates, trip profile information, configuration data or any other appropriate type of information. The communications port 420 may be implemented with any appropriate communications protocol or physical layer, including but not limited to ethernet, RS232, CAN (controller area network), USB (universal serial bus), or an industry standard protocol such as ARINC 429 or 629, as used in aviation.

The adaptive imaging module 40 has a power supply 480 which provides power to the on-board systems and functions. The power supply 480 may be connected directly to vehicle power or to an alternative energy source such as a battery.

Optionally, the adaptive imaging module 40 has a sound and intercom system interface 450 which is tied into an on-board cabin microphone system and/or vehicle intercom system. The sound and intercom system interface 450 allows the adaptive imaging module 40 to record ambient cabin sound and/or verbal communications made by the vehicle operators.

Figure 4B:
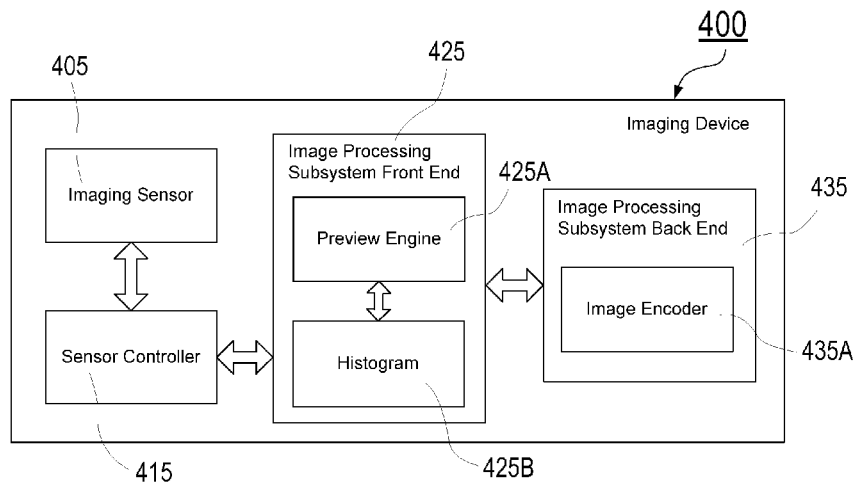
FIG. 4B is a high-level block diagram showing additional detail on the imaging device component of the adaptive imaging module of FIG. 4A.

FIG. 4B is a high-level block diagram showing additional detail on the imaging device component of the adaptive imaging module of FIG. 4A. The imaging device 400 contains an imaging sensor 405, a sensor controller 415, an image processing subsystem front end 425, and an image processing subsystem back end 435. The imaging sensor 405 is a device that converts an optical image to an electrical signal. The imaging sensor 405 may be a charge-coupled device (CCD), a complementary metal-oxide-semiconductor (CMOS) active-pixel sensor, or any other appropriate imaging sensor. A CCD imaging sensor uses a lens to project an image onto a special photoactive layer of silicon attached to a capacitor array. Based on the light intensity incident on a region of the photoactive layer, the corresponding capacitors in the array accumulate a proportional electrical charge, and this array of electrical charges is a representation of the image. A CMOS device, on the other hand, is an active pixel sensor consisting of an array of photo sensors (active pixels) made using the CMOS semiconductor process. Circuitry next to each photo sensor converts the light energy to a corresponding voltage. Additional circuitry on the CMOS sensor chip may be included to convert the voltage to digital data. These descriptions are provided as background only and are not meant to infer than the imaging sensor is limited to being either a CCD or CMOS device. As illustrated by the examples described in the previous paragraph, the imaging sensor 405 is used to capture raw pixel information, wherein each pixel captured represents a corresponding brightness level detected from an area of an object. A sensor controller 415 controls the functions of the imaging sensor 405, including, among other things, the exposure time of the imaging sensor 405 (that is, the duration for which the imaging sensor 405 is allowed to be exposed to the light being reflected or cast from an environment). The sensor controller 415 then transfers the raw pixel data from the imaging sensor 405 to an image processing subsystem front end 425. The image processing subsystem front end 425 contains a preview engine 425A and a histogram 425B. The preview engine 425A temporarily receives the raw pixel data so that it can be analyzed and processed by the sensor controller 415. The histogram 425B is a buffer area that contains information related to the relative brightness of each pixel, stored as a number of counts (that is, a digital number representing the magnitude of the analog brightness value of each pixel). The sensor controller 415 analyzes the count values contained in the histogram 425B and determines if certain areas of pixels are overexposed or underexposed, and then directs the imaging sensor 405 to change its exposure time appropriately to adjust the brightness levels obtained.

The image processing subsystem front end 425 allows the imaging device 400 to perform advanced light metering techniques on a small subset of the captured pixels, as opposed to having to perform light metering on an entire image. For the purpose of this document, the phrase "advanced light metering techniques" shall be defined as any light metering techniques, such as those typically used in digital photography, which can be applied to a selected portion of an object to be imaged as opposed to the object as a whole, and which can be tightly controlled by a software program or electronic hardware. The advanced light metering techniques used in the present invention are further described in FIG. 8 and in the corresponding portion of this specification.

This advanced light metering capability, among other things, distinguishes the present invention over the existing art. If the dynamic lighting conditions as described in FIG. 3 are present, one portion of a gauge 100 or other feature of an instrument panel 10 may be in bright light 310 while another may be in dark shadow 320, for example.

Existing prior art camera systems have very limited light metering capabilities, if any, and must be preconfigured to focus on one type of light condition. If a prior art camera system is adjusted to capture images based on light conditions typical to the interior of a vehicle, the scenery that would otherwise be visible outside the vehicle (through the windscreen or windshield) will be washed out and indiscernible. Conversely, if a prior art camera system is adjusted to capture images of the outside world, images from inside the vehicle, such as the instrument panel, will be too dark and unreadable.

The advanced light metering capabilities of the present invention allow it to adjust for varying light conditions across a small subset of image pixels, selecting one light meter setting for one area of pixels and another setting for a different area of pixels. In this manner, specular highlights 340 and areas of different ambient light intensity (310, 320, and 330) can be compensated for and eliminated to create a single image of a gauge 100 or other feature of unparalleled quality.

Once the raw pixel data has been captured and corrected by the image processing subsystem front end 425, the corrected pixel data is sent to an image processing subsystem back end 435, which contains an image encoder 435A. The image encoder 435A is a device that is used to convert the corrected pixel data into an image file in a standard image file format. A JPEG encoder is one type of image encoder 435A that is used to create images in the industry standard JPEG file compression format. Any other appropriate image file format or encoder could be used without deviating from the scope of the invention.

In the preferred embodiment, the image processing subsystem back end 435 is an optional component, as the imaging device 400 will normally work directly with the raw image data that is created as a product of the image processing subsystem front end 425, without requiring the standard image file output by the image processing subsystem back end 435. However, the image processing subsystem back end 435 is included in the preferred embodiment to allow the imaging device 400 to output images in standard file formats for use in external systems (not described herein and not considered part of the present invention).

Figure 5:
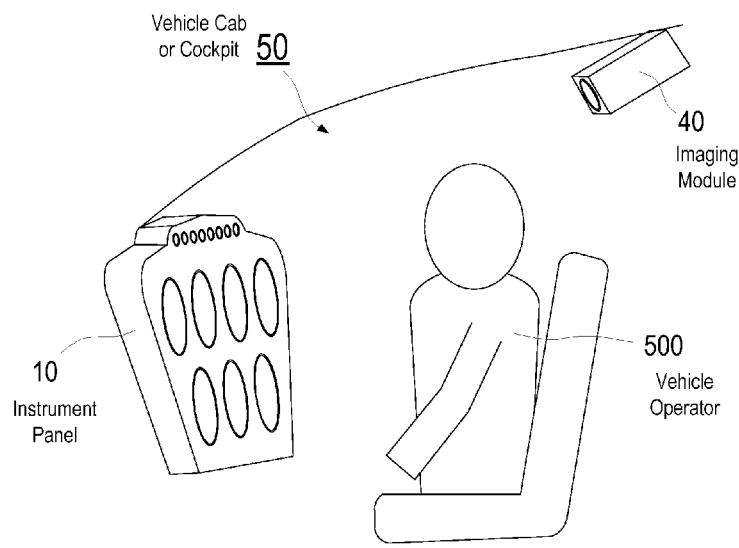
FIG. 5 is a perspective view representing a cockpit or vehicle cab showing the mounting relationship between the adaptive imaging module of FIG. 4 and the instrument panel of FIGS. 1 and 2.

FIG. 5 is a perspective view representing a cockpit or vehicle cab 50 showing the mounting relationship between the adaptive imaging module 40 of FIG. 4 and the instrument panel 10 of FIGS. 1 and 2. The adaptive imaging module is mounted in the cockpit or vehicle cab 50 such that it can capture images of the instrument panel 10. The adaptive imaging module 40 is typically mounted above and behind a vehicle operator 500, in order to be able to capture images from the instrument panel 10 with minimum interference from the vehicle operator 500. However, the adaptive imaging module 40 may be mounted in any appropriate location within the cockpit or vehicle cab 50.

Figure 6A:
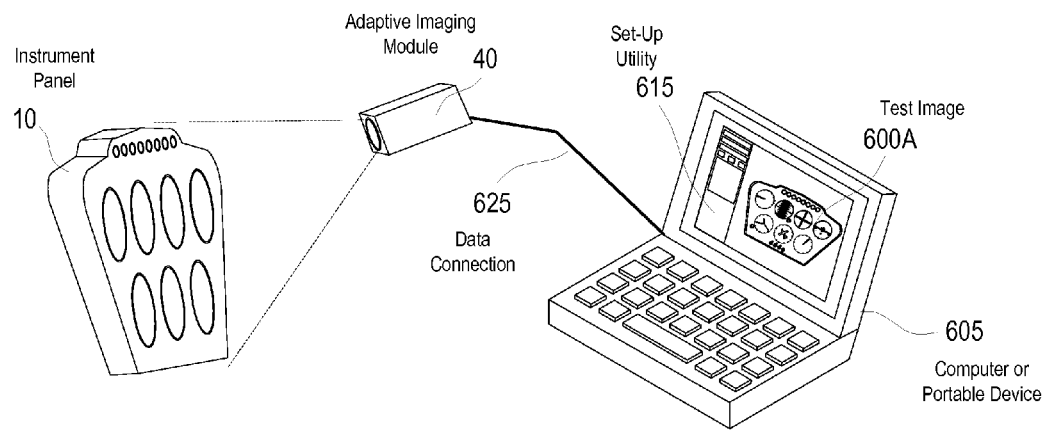
FIG. 6A is a perspective view of one embodiment of a system for use in calibrating the invention for first-time use in a vehicle.
Figure 6B:
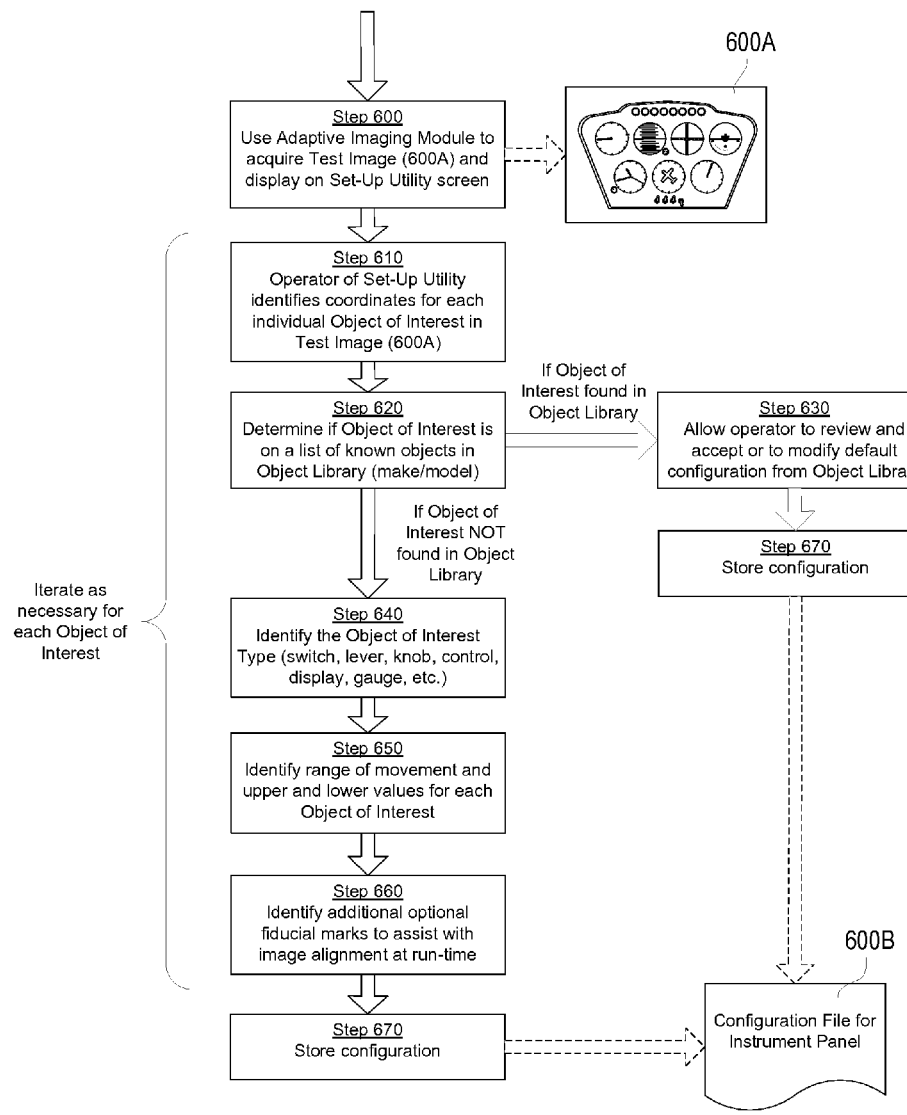
FIG. 6B is a flowchart describing one embodiment of a method of setting up and calibrating the invention for first-time use in a vehicle.
Figure 6C:
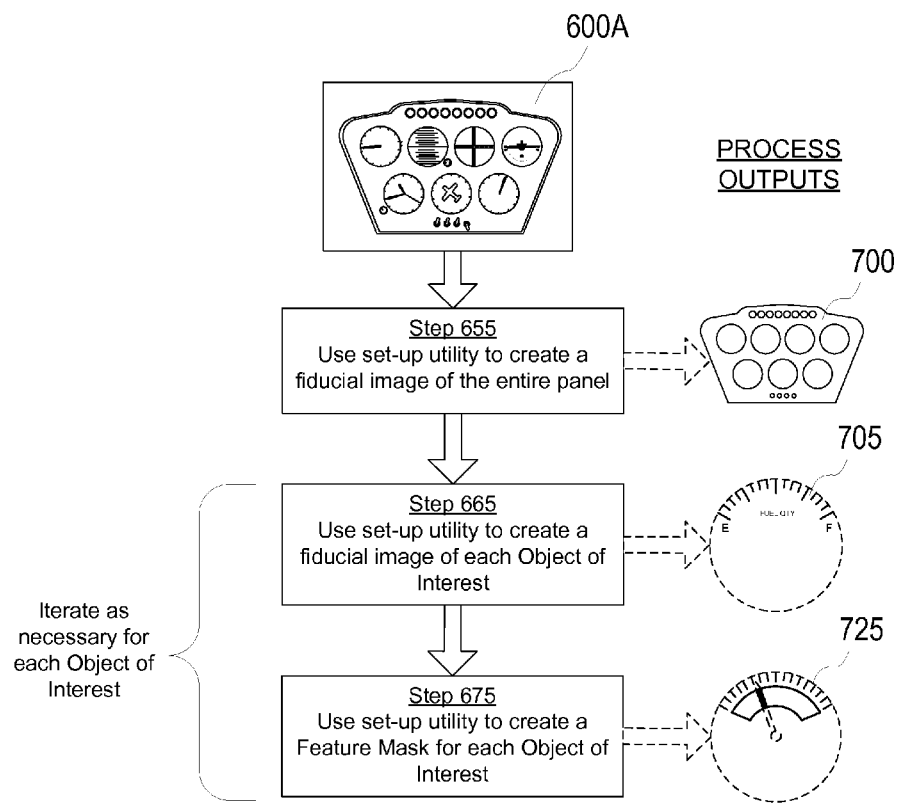
FIG. 6C is a flowchart describing one embodiment of a method of capturing fiducial images for use in image alignment.

Referring now to FIGS. 6A, 6B, and 6C a system for use in calibrating the invention for first-time use in a specific vehicle cab or cockpit will be described. A computer 605 hosting a set-up utility 615 is connected via a data connection 625 to the adaptive imaging module 40. The computer 605 may be a laptop, tablet or desktop computer, personal digital assistant or any other appropriate computing device. The data connection 625 may be a hardwired device-to-device connection directly connecting the computer 605 to the adaptive imaging module 40, a wireless interface, an optical connection such as a fiber optic cable or a wireless infrared transmission method, a network connection including an internet connection, or any other appropriate means of connecting the two devices together such that data can be exchanged between them. The set-up utility 615 is a software application that is executed before the adaptive imaging module 40 can be used for the first time on a new type of instrument panel 10. The purpose of the set-up utility 615 is to allow an operator to identify the location, significance, and data priority of each feature of an instrument panel 10. In the preferred embodiment, this process is done as described in the flowchart of FIG. 6B.

The adaptive imaging device 40 is used to acquire a test image 600A of the instrument panel 10 [Step 600]. Ideally, the test image 600A is captured in controlled lighting conditions such that a crisp, clean image of the instrument panel 10 is captured for the set-up process. The operator of the set-up utility 615 identifies the location within the test image 600A of each object of interest, which may be a gauge 100, status light 110, rotary knob 120, functional switch 130 or any other visually discernible feature on the instrument panel 10 [Step 610]. Throughout the remainder of this specification, the term "object of interest" shall be used as a general term to refer to these visually discernible features (gauges, lights, knobs, levers, etc.) seen in an image within the vehicle, and which are the target of the processing describe herein.

For each object of interest on the instrument panel 10 or elsewhere, it must be determined if the object is on a list of known object types in an object library, or if a new object type must be created for the corresponding feature [Step 620]. In one embodiment of the invention, Step 620 is performed manually by the operator of the set-up utility 615. In an alternative embodiment, Step 620 is performed automatically using optical recognition techniques to attempt to match the object of interest to an object type in the object library. If the object of interest from the test image 600A already exists in a predefined library of similar objects, the set-up utility 615 allows the operator to review the default configuration for that object type and accept it as is or make modifications to it [Step 630]. Once the object type is accepted by the operator, the set-up utility 615 stores the configuration data for that feature of the instrument panel 10 in a configuration file 600B for that specific instrument panel for future use [Step 670].

If, on the other hand, the object of interest is found not to exist in a library of pre-defined objects in Step 620, the operator must manually identify the object type [Step 640]. For example, the operator may determine the object of interest is a 3-Inch Altimeter Indicator, part number 101720-01999, manufactured by Aerosonic. The operator must then identify the possible range of movement of the needles (which, for an altimeter, would be a full 360 degrees) and identify the upper and lower values for each needle, as well as the increment represented by each tick mark on the altimeter image [Step 650]. Optionally, the operator may identify graphics or features on the object of interest, such as the letters "ALT" on an altimeter, which could be used as "fiducial" marks for later image alignment [Step 660]. For the purposes of this discussion, the term "fiducial" shall be defined as a fixed standard of reference for comparison or measurement, as in "a fiducial point", that can be used in the image alignment process. Once the new object of interest type is fully defined by Steps 640 through 660, the new object type is stored in a configuration file 600B for future use [Step 670]. The set-up process defined in FIGS. 6A and 6B should only need to be performed once for each aircraft or vehicle type, assuming there is a large percentage of common features for each vehicle of that type. After that, the object type information stored in the configuration file 600B for that aircraft type should be sufficient. This configuration file 600B is uploaded and stored in the on-board memory module 430 of the adaptive imaging module 40, so that it can be retrieved as needed during in-trip image processing.

FIG. 6C is a flowchart describing one embodiment of a method of capturing fiducial images for use in image alignment. The operator of the set-up utility 615 uses the test image 600A to create an outline-only version of the of the instrument panel 10 [Step 655], referred to herein as a panel fiducial image 700, and further illustrated in FIG. 7A. This panel fiducial image 700 consists of outline drawings of each feature on the instrument panel 10, including but not limited to gauge outlines 720, status light outlines 730, and outlines of functional switches 740, as well as an outline of the enclosure of the instrument panel itself 710. These outlines can be created in a manual process, where the operator uses the set-up utility 615 to manually draw outlines around the features of the instrument panel. This manual process may be aided or replaced entirely by a simple edge-detection algorithm, a standard image processing algorithm used to automatically detect the abrupt edges in an image found at the interface between one feature and the next. Edge detection algorithms are well known in the art.

The purpose for creating a panel fiducial image 700 is to aid in determining the proper alignment of the images captured by the adaptive imaging module 40. Because the spatial relationship between features in the panel fiducial image 700 are fixed, this relationship can be used to determine the angle of a given gauge image. For example, the adaptive imaging module 40 captures an image of the entire instrument panel 10. Because the adaptive imaging module 40 and the instrument panel 10 are independently mounted (mounted to different structures within the vehicle), and further because the instrument panel 10 is often spring-mounted in some vehicles, the angle of the adaptive imaging module 40 to the instrument panel 10 is constantly changing. One image taken of the instrument panel 10 may be at a slightly different angle than an image taken only moments later. This becomes a problem for an image analysis algorithm that is trying to determine the angle of a needle on a gauge to determine that gauge's reading. However, the relationship among the various features integral to the instrument panel 10 is constant.

The panel fiducial image 700 can be used as a template against which to compare each new image taken. An image analysis algorithm can continue to estimate the angle of the new image until it is aligned with the panel fiducial image 700.

Figure 7A:
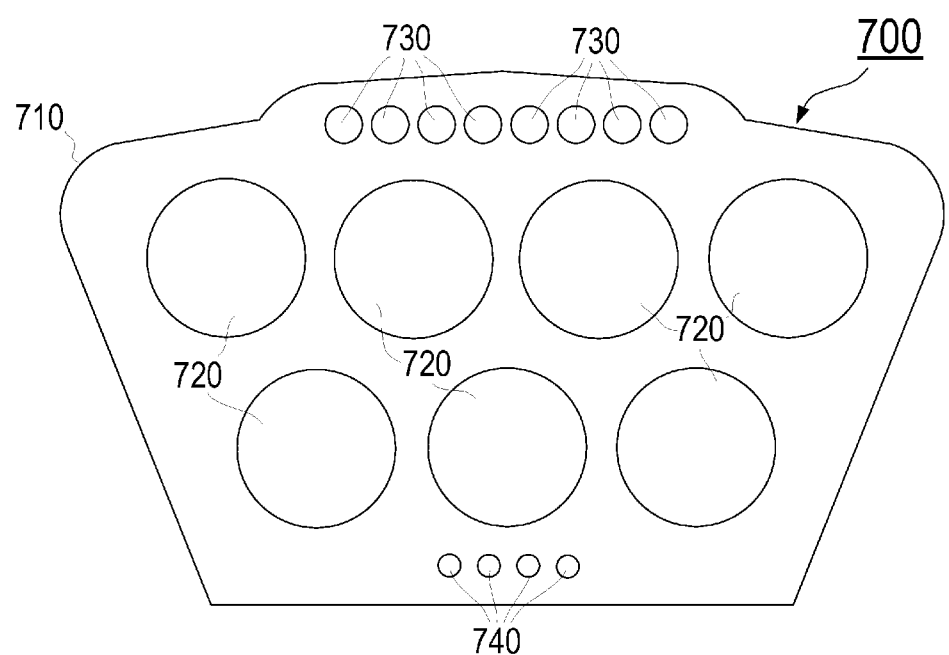
FIG. 7A shows how the arrangement of the gauges on a given instrument panel can be used as a fiducial image that can be used to determine the correct alignment of the image.
Figure 7B:
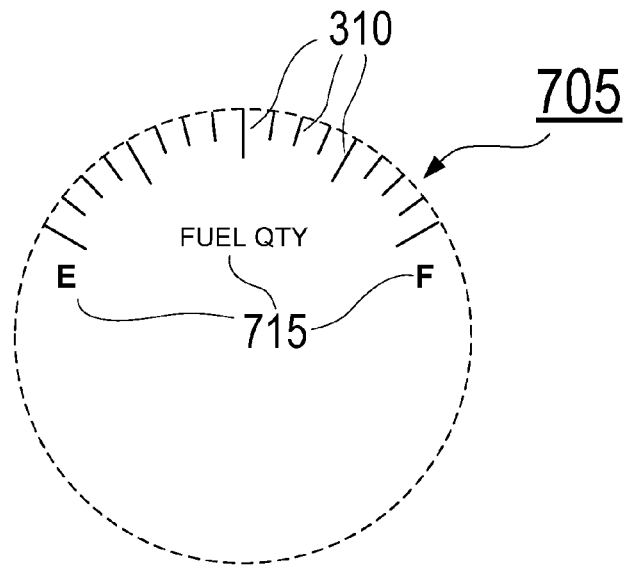
FIG. 7B shows how certain features on a specific gauge can be used as a fiducial image to determine the correct alignment of an image of the corresponding gauge.

Similarly, the set-up utility 615 can be used to create a fiducial image of each individual object of interest in the test image 600A [Step 665 of FIG. 6C]. An example "feature fiducial image" 705 is shown in FIG. 7B. The operator uses the set-up utility 615 to identify items on the feature fiducial image 705 which can later be used for image alignment purposes. These items may include tick marks 310, gauge graphics 715, or any other appropriate item on the face of the object of interest, the position of which is fixed and constant in relation to the face of the object of interest.

Figure 7C:
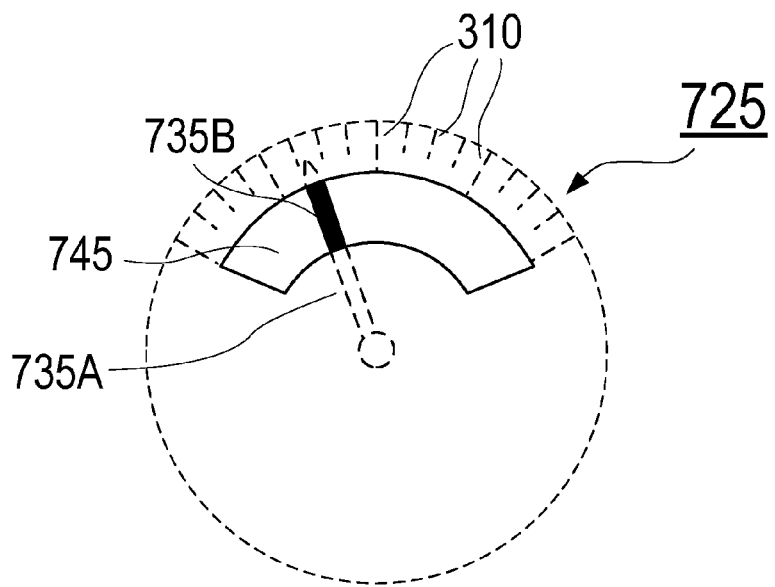

Finally, the set-up utility 615 is used to identify and create a feature mask 725 for each object of interest [Step 675 of FIG. 6C]. An example feature mask 725 is shown in FIG. 7C. For most of the objects of interest in a given instrument panel 10, there is only a small part of the image of that object which is actually needed to determine the exact state of the object of interest. For example, for a given mechanical gauge, such as the one shown in FIG. 7C, only a small unmasked region 745 for that gauge is needed to determine the value shown on that gauge. If the gauge image has already been aligned properly (using the panel fiducial image and the feature fiducial images of FIGS. 7A and 7B), the tick marks 310 on the gauge are unimportant, as they are a feature that cannot change from one properly aligned image to the next.

The operator uses the set-up utility 615 to identify the unmasked region 745 for each specific object of interest. This may be done by drawing an outline around a portion of the image of each object of interest to create the unmasked region 745, or by selecting a pre-defined mask template from an existing library. For the illustrative example in FIG. 7C, a portion of the gauge needle 735B falls within the unmasked region 745, and another portion 735A falls outside of the unmasked region 745. Only the 735B needle portion is necessary to determine the angle of the entire needle in relation to the gauge itself.

Figure 8:
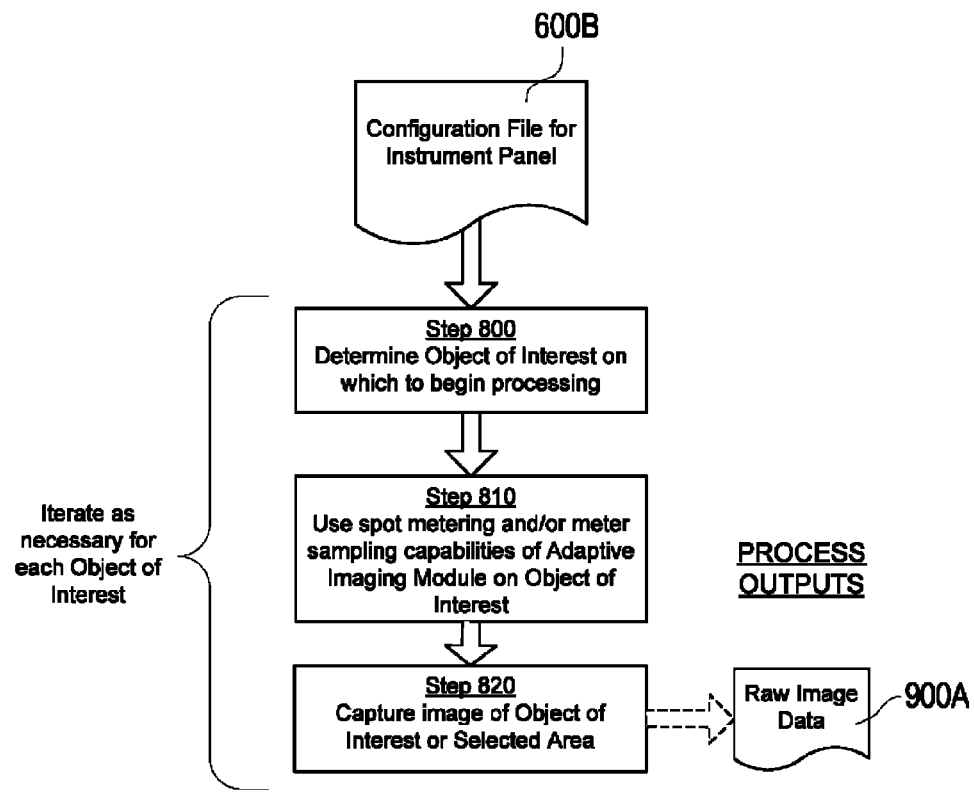
FIG. 8 is a flowchart describing one embodiment of a method for acquiring image data from a vehicle using the imaging module of FIG. 4A.

This feature mask 725 is used during the spot metering process described in FIG. 8. The feature mask 725 defines an "area of interest" on which the spot metering process can be applied. This spot metering process is described in more detail later in this specification.

The panel fiducial image 700, feature fiducial image 705, and feature mask 725 are stored in the configuration file 600B for the instrument panel, which is itself stored in the memory module 430 of the adaptive imaging module 40. The configuration file 600B is retrieved as needed during the image acquisition process shown in FIG. 8. It should be noted that the term "configuration file", as used herein, shall refer to a collection of configuration data items that may actually be physically stored in more than one file, or in more than one physical location.

FIGS. 7B and 7C are illustrative only and show a mechanical gauge as an example for creating the feature fiducial images 705 and feature masks 725. Any other appropriate object of interest, such as a status light 110, rotary knob 120, or functional switch 130 may also be used to create feature fiducial images 705 and feature masks 725. For example, the feature fiducial image 705 for a functional switch 130 may use the lettering beneath the functional switch 130 as the fiducial for alignment purposes.

Once the calibration processes described above in FIGS. 6A through 7C are completed, the adaptive imaging module 40 may be used to acquire and analyze images during an actual trip. FIG. 8 is a flowchart describing one embodiment of a method for acquiring image data from an instrument panel 10 using the adaptive imaging module 40. The adaptive imaging module 40 determines on which object of interest it should begin processing [Step 800] by reviewing the configuration file 600B stored in the memory module 430. The configuration file 600B contains the configuration data specific to each object of interest, including the object's location in the instrument panel 10, the panel fiducial image 700, and the corresponding feature fiducial image 705 and feature mask 725 for that object.

Using the data retrieved from the configuration file 600B, the adaptive imaging module 40 uses software-controlled light metering capabilities to control the settings of the imaging device 400 such that a clear image of the object of interest can be captured [Step 810]. The adaptive imaging module 40 is capable of using advanced metering techniques including but not limited to spot metering (that is, taking a meter reading from a very specific, localized area within an object of interest), average metering (that is, taking a number of meter readings from different locations within an object of interest and averaging the values to obtain a file exposure setting), and center-weighted average metering (that is, concentrating the metering toward the center 60 to 80% of the area to be captured). Because each object of interest has an associated feature mask 725 which isolates the portion of the object that should be imaged, the adaptive imaging module 40 can concentrate its light metering efforts on only that area, eliminating much of the concern of dealing with large areas of dynamic lighting conditions such as those shown in FIG. 2.

Finally, an image is captured of the object of interest or of the area defined specifically by the object's feature mask 725 [Step 820]. This process is repeated as necessary for each object of interest. Raw image data 900A is created for each object of interest, and this raw image data 900A is processed as described in FIG. 9.

Figure 9:
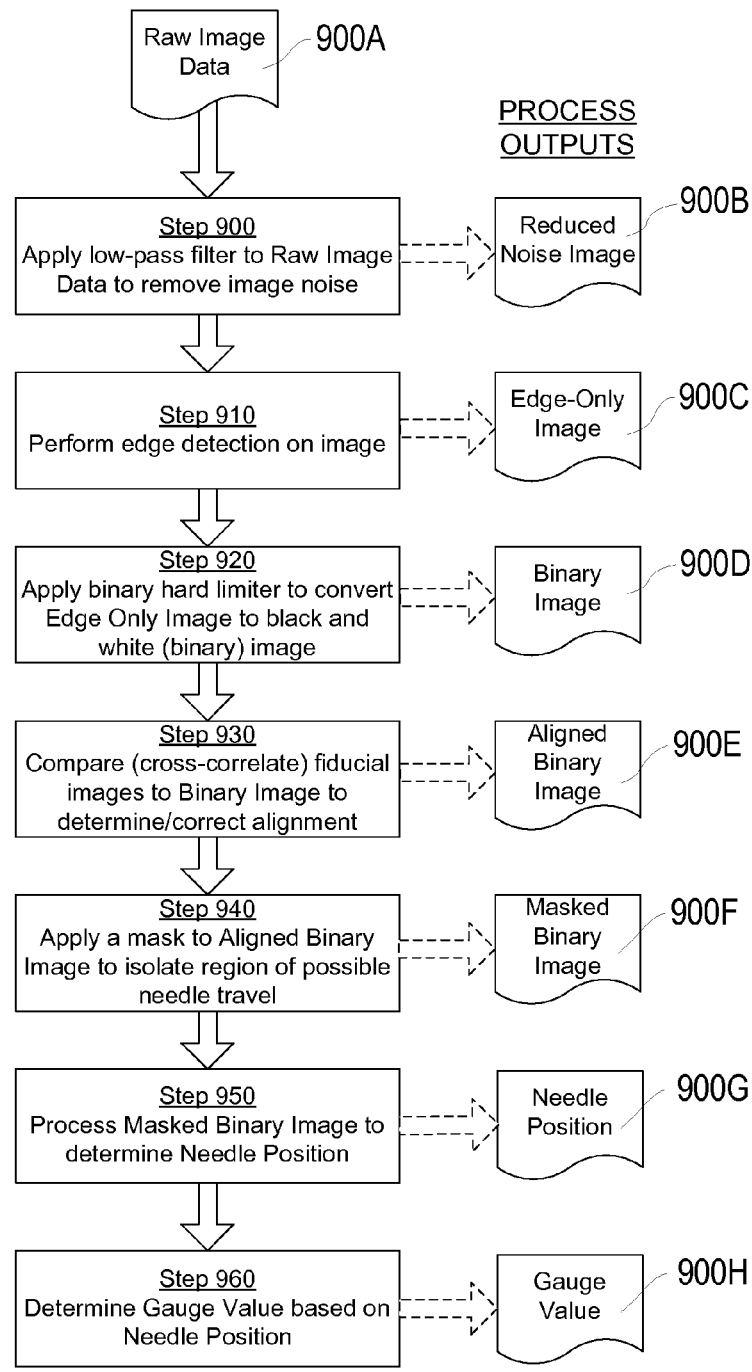
FIG. 9 is a flowchart describing one embodiment of a method for retrieving and processing numeric data from images of a portion of a vehicle.

FIG. 9 is a flowchart describing one embodiment of a method for retrieving and processing numeric data from images of an instrument panel. Once the raw image data 900A is acquired by the adaptive imaging module 40, a low-pass filter is applied to remove image noise [Step 900] to create a reduced noise image 900B. Edge detection is performed on the reduced noise image 900B [Step 910] to create an edge-only image 900C. As used in this document, the term "edge detection" refers to the use of an algorithm which identifies points in a digital image at which the image brightness changes sharply or has detectable discontinuities. Edge detection is a means of extracting "features" from a digital image. Edge detection may be performed by applying a high pass filter to the reduced noise image 900B, by applying an image differentiator, or by any appropriate method. An example of an edge detection algorithm is disclosed in U.S. Pat. No. 4,707,647 for Gray Scale Vision Method and System Utilizing Same, which is incorporated herein by reference.

A binary hard-limiter is applied to the edge-only image 900C to convert it to a binary (black and white) image 900D [Step 920]. The binary image 900D is then cross-correlated against fiducial images (such as the panel fiducial image 700 and feature fiducial image 705) to bring the image into correct alignment [Step 930], creating an aligned binary image 900E. Optionally, a mask such as the feature mask 725 may be applied to the aligned binary image 900E to create a masked binary image 900F [Step 940]. Creating the masked binary image 900F would eliminate all but the most crucial portion of the aligned binary image 900E in order to simplify processing.

The masked binary image 900F is now processed to determine the needle position 900G in relation to the gauge [Step 950]. This processing may be done in a number of ways. In one embodiment, synthetic images of the gauge face (or the pertinent portion thereof, if the image is masked) are generated, each drawing the needle in a slightly different position. These synthetic images are compared to the masked binary image 900F until a match is found. When the match is found, the angle of the needle in the synthetic image matches the actual needle angle. In an alternative embodiment, linear regression is used to find the needle, which consists of doing a least squares line fit to all the points (pixels) that come out of the masked binary image to determine the needle position 900G. Any other appropriate processing method can be used.

Finally, the gauge value 900H is determined based on the needle position 900G [Step 960]. This is done by retrieving the upper and lower limits and range of travel information for the needle for the corresponding object type from the configuration file 600B from the memory module 430 and comparing the current needle position 900G to those values.

The use of the term "needle" in FIG. 9 is meant to be illustrative only, and should not be considered to limit the process only to images of mechanical gauges. For the purposes of FIG. 9, the term "needle" can be said to refer to any moving or changing part in an image, and may equally refer to the position of a switch or lever or the condition (illuminated or not illuminated) of a light, or the position or state change of any other appropriate feature on an instrument panel 10.

Figure 10:
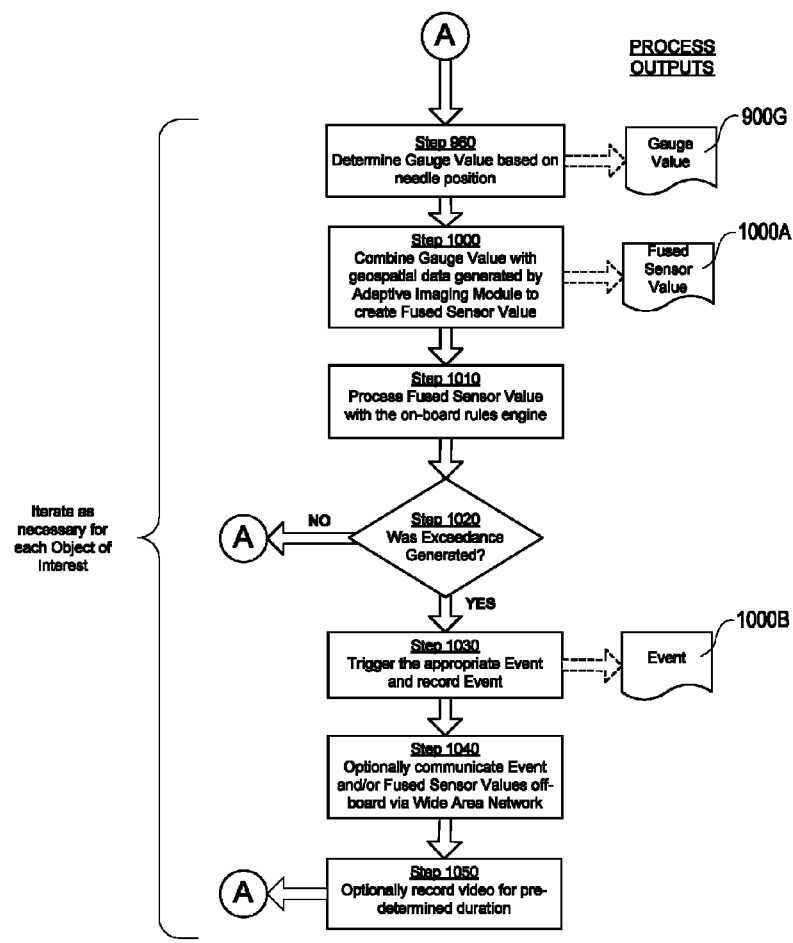
FIG. 10 is a flowchart describing one embodiment of a method for using numeric data as acquired and described in FIG. 9 to generate real-time information about the trip or flight in process.

FIG. 10 is a flowchart describing one embodiment of a method for using numeric data as acquired and described in FIG. 9 to generate real-time information about the trip or flight in process. Because the adaptive imaging module 40 contains a GNSS receiver 410 and an inertial measurement unit (IMU) 440, additional functionality can be achieved which cannot be achieved with a stand-alone imaging device 400. The gauge value 900G determined in Step 960 can be combined with location and orientation data from the GNSS receiver 410 and the IMU 440 to create a fused sensor value 1000A [Step 1000]. For the purposes of this discussion, the term "fused sensor value" shall refer to a set of data consisting of, at a minimum, a time/date stamp, the location and orientation of the vehicle in three-dimensional space corresponding to the time/date stamp, and the value of the gauge (or other object of interest) corresponding to the time/date stamp.

This fused sensor value 1000A is then processed by an on-board rules engine [Step 1010]. The rules engine is a software application which contains a terrain model (containing information on the surrounding terrain), a set of predefined trip profiles (rules applied to certain types of vehicles to ensure safe or efficient use), or a combination of the two. This rules engine can be used to determine if a situation exists that should be communicated to the operator or a base station, or which may automatically initiate an action in response to the situation. In Step 1020, the rules engine analyzes the fused sensor value 1000A to determine if an exceedance was generated. For the purposes of this discussion, an "exceedance" shall be defined as any condition that is detected that either violates a defined trip profile or results in an unsafe situation. For example, the rules engine may contain a flight profile for an aircraft that specifies that a rapid descent below 500 feet in altitude is dangerous. When the adaptive imaging module 40 detects that the aircraft is in violation of this flight profile (which it does by comparing the fused sensor values 1000A obtained from the altimeter, airspeed indicator, and vertical airspeed indicator), an exceedance would be generated. In another example, an exceedance may be generated when the fused sensor value 1000A for the altimeter indicates that the aircraft is getting too close to the ground (based on a model of the surrounding terrain embedded within the rules engine).

If no exceedance is generated, the process returns to Step 960 and is repeated. If, however, an exceedance was generated, an event 1000B is triggered and recorded [Step 1030]. For the purposes of this discussion, an "event" will be defined as the result of a specific exceedance, and may consist simply of a recorded message being stored in memory for later retrieval, or may trigger an action within the vehicle (such as the sounding of an audible alarm or the illumination of a warning icon).

Optionally, the generated event 1000B and other data may be transmitted off-board via a wide area network such as a telemetry device [Step 1040]. For the purposes of this document, a telemetry device shall be defined to be any means of wireless communication, such as transmission over a satellite or cellular telephone communications network, radio frequency, wireless network, or any other appropriate wireless transmission medium. The generated event 1000B may optionally trigger the recording of video by the adaptive imaging module 40 for a pre-determined duration [Step 1050] in order to capture activity in the cockpit or vehicle cab corresponding to the event.

The process described in FIG. 10 can be used in a flight operations quality assurance (FOQA) program. An example of such a FOQA program is disclosed in U.S. Patent Publication No. 2008/0077290 for Fleet Operations Quality Management System, which is assigned to a common assignee herewith and is incorporated herein by reference. A FOQA program, also known as Flight Data Management (FDM) or Flight Data Analysis, is a means of capturing and analyzing data generated by an aircraft during a flight in an attempt to improve flight safety and increase overall operational efficiency. The goal of a FOQA program is to improve the organization or unit's overall safety, increase maintenance effectiveness, and reduce operational costs. The present invention allows a FOQA program to be easily applied to an aircraft or fleet of aircraft. The adaptive imaging module 40 does not require any logical connection to an aircraft's existing systems, and can be used on an aircraft that does not have electronic systems or computer control. All necessary data required to implement the FOQA system can be acquired from the image data captured from an aircraft cockpit as described herein. The rules engine of Step 1010 can encode the flight profiles for the aircraft types being tracked by a particular FOQA program.

Preferably all processing required by the system can be completed in real time. For the purposes of this document, the phrase "real time" shall be interpreted to mean "while a vehicle is being operated" or "while the vehicle is in motion". The system also preferably accommodates individual metering control of a small area (subset) of image pixels for processing and use in a self-contained on-board FOQA system, as described herein. The present invention can be used completely in real time (during the trip of a vehicle), is fully self-contained, and does not require post-processing.

Figure 11:
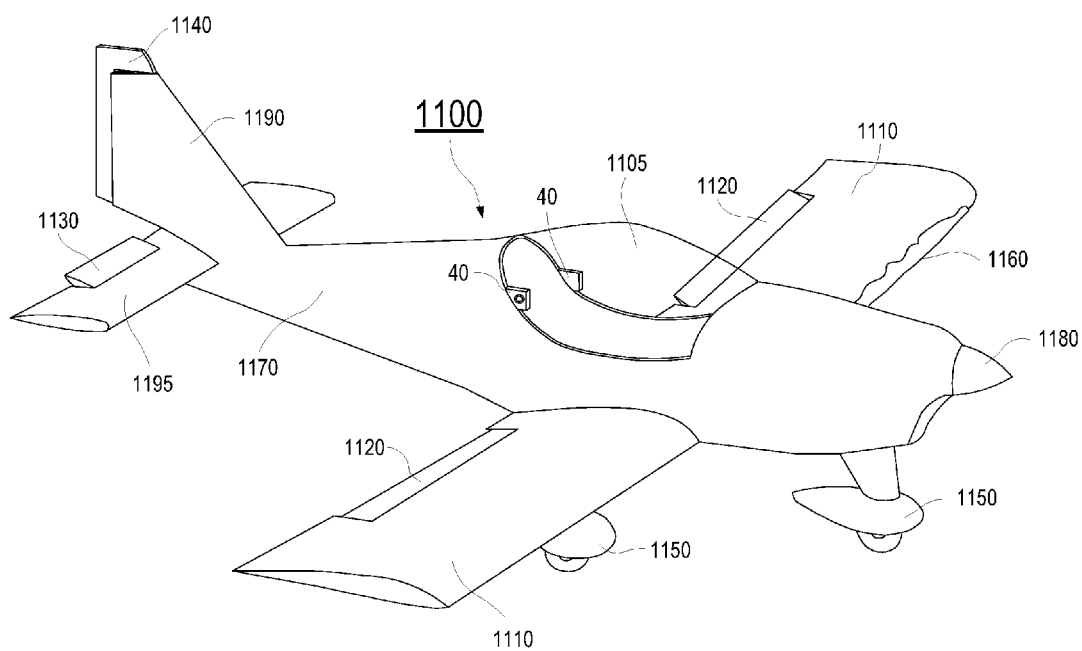
FIG. 11 is a perspective view of an aircraft showing the various external surfaces and features of the aircraft that can be captured by an imaging module in an alternative embodiment of the present invention.

FIG. 11 is a perspective view of an aircraft 1100 showing the various external surfaces and features of the aircraft that can be captured by an adaptive imaging module 40. In this alternative embodiment of the invention, the adaptive imaging module 40 is mounted such that it can capture raw image data from the exterior surfaces of the aircraft 1100. One or more adaptive imaging modules 40 can be mounted on the interior of an aircraft cockpit 1105 such that they are facing the appropriate external surfaces of the aircraft. In this manner, image data from aircraft control surfaces such as flaps/ ailerons 1120, elevator 1130, and rudder 1140 can be captured and analyzed according to the processes outlined in FIGS. 6B through 10, where the position and state of an external control surface is used instead of a gauge or user control. The process outlined in FIG. 6C can be used to create a fiducial image of a corresponding control surface, such that the fiducial image can be used in the image alignment process described in FIG. 9. The image analysis of FIG. 9 is performed to determine the equivalent position of the corresponding control surface, in order to turn the image of the position of the control surface into a corresponding numeric value for use by the pilot/operator of the vehicle and by other onboard systems.

Other external features of the vehicle, such as the wings 1110, propeller 1180, landing gear 1150, horizontal stabilizer 1195, vertical stabilizer 1190, and fuselage 1170, can be captured and analyzed by the adaptive imaging module 40, as well. For example, an image of a wing 1110 or horizontal stabilizer 1190 could be analyzed to look for ice build-up 1160. Another example would be to use the adaptive imaging module 40 to determine the state and current position of the landing gear 1150.

Figure 12:
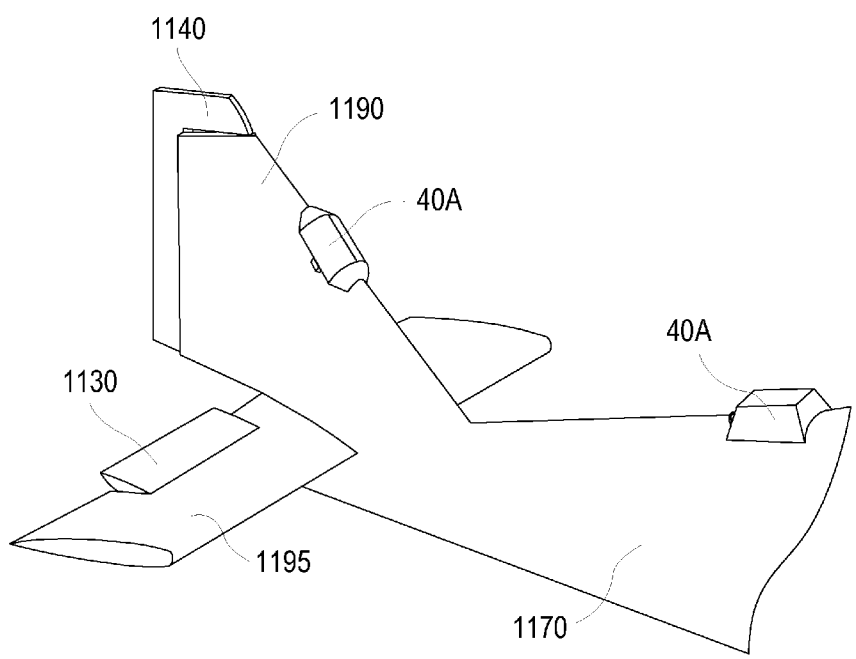
FIG. 12 is a perspective view of the empennage of an aircraft showing externally-mounted imaging modules comprising alternative embodiments of the present invention.

FIG. 12 is a perspective view of the empennage of an aircraft showing potential mounting locations for an externally-mounted adaptive imaging module 40A. Please note that the reference designator "40A" is used in FIG. 12 to distinguish an externally-mounted adaptive imaging module 40A from an internally-mounted adaptive imaging module 40. Both devices contain similar internal components, with a difference being that the externally-mounted adaptive imaging module 40A may be aerodynamically packaged and environmentally sealed for external use. The block diagrams of FIG. 4A and FIG. 4B apply to adaptive imaging module 40A, as well as to adaptive imaging module 40.

FIG. 12 shows two alternative placements for external adaptive imaging modules 40A. An adaptive imaging module 40A may be mounted to the surface of the fuselage 1170, or to the surface of the vertical stabilizer 1190. It should be obvious to one skilled in the art that any number of adaptive imaging modules 40A could be mounted in any location on the exterior surface of the aircraft 1100, providing that they do not impede the movement of the control surfaces or significantly affect the aerodynamic properties of the aircraft. It would also be appropriate to use any number of internally-mounted adaptive imaging modules 40, externally-mounted adaptive imaging modules 40A, or any combination thereof, to capture sufficient image data of the interior and exterior of a vehicle.

It should be noted that, although an aircraft 1100 is shown in FIGS. 11 and 12, it would be obvious to one skilled in the art that an internally-mounted adaptive imaging module 40 or externally-mounted adaptive imaging module 40A could be used in a similar manner on any type of vehicle to capture image data as described herein. Without limitation, examples include terrestrial vehicles, unmanned aerial vehicles (i.e., drones), marine vehicles and spacecraft.

Having described the preferred embodiments, it will become apparent that various modifications can be made without departing from the scope of the invention as defined in the accompanying claims. In particular, the processes defined within this document and the corresponding drawings could be altered by adding or deleting steps, or by changing the order of the existing steps, without significantly changing the intention of the processes or the end result of those processes. The examples and processes defined herein are meant to be illustrative and describe only particular embodiments of the invention.

The invention claimed is:

1. A method of acquiring information from an image of at least a portion of a vehicle comprising the steps of:
    mounting at least one imaging device aboard said vehicle, wherein said imaging device has a view of an external control surface of said vehicle;
    providing a computer processor connected to and controlling said imaging device;
    capturing an image of said external control surface with said imaging device;
    inputting said image to said computer processor;
    identifying with said computer processor a state of said image; and
    said computer processor providing an output corresponding to said image state.

2. The method of claim 1, wherein the output corresponding to said image state represents the status of said external control surface.

3. The method of claim 2, wherein the status of said external control surface is chosen from the group consisting of on, off, illuminated, not illuminated, deployed, retracted, home position, out of home position, present, not present, damaged, not damaged, moving, and not moving.

4. The method of claim 1, wherein the output corresponding to said image state represents the position of said external control surface as a numeric displacement from a starting position.

5. The method of claim 1 further comprising the steps of:
    analyzing said image state with a rules engine executing on said computer processor; and
    determining if said image state indicates that said vehicle is in violation of a condition defined by said rules engine and, if so, initiating an appropriate response to said violation.

6. The method of claim 5 wherein said rules engine comprises aircraft flight profile rules as used by a flight operations quality assurance (FOQA) program.

7. The method of claim 1, wherein the external control surface is chosen from among the group comprising rudder, elevator, aileron, flap, landing gear, wing, and propeller.

8. A method of acquiring information from an image of at least a portion of a vehicle comprising the steps of:
    mounting at least one imaging device aboard said vehicle, wherein said imaging device has a view of an external surface of said vehicle;
    providing a computer processor connected to and controlling said imaging device;
    capturing an image of said external surface with said imaging device;
    inputting said image to said computer processor;
    identifying with said computer processor a state of said image;
    providing said imaging device with advanced light metering capabilities; and
    said computer processor providing an output corresponding to said image state.

9. The method of claim 8 wherein the step of said computer processor providing an output corresponding to said image state applies said advanced light metering capabilities directly to raw pixel data before an image file is created.

10. The method of claim 8, wherein the output corresponding to said image state represents the status of said external control surface.

11. The method of claim 10, wherein the status of said external control surface is chosen from the group consisting of on, off, illuminated, not illuminated, deployed, retracted, home position, out of home position, present, not present, damaged, not damaged, moving, and not moving.

12. The method of claim 8, wherein the output corresponding to said image state represents the position of said external control surface as a numeric displacement from a starting position.

13. A method of acquiring information from an image of at least a portion of a vehicle comprising the steps of:
- mounting at least one imaging device aboard said vehicle, wherein said imaging device has a view of an external surface of said vehicle chosen from among the group consisting of fuselage, door, wing, tail, landing gear, control surface, propeller, window, engine, and exterior light;
- providing a computer processor connected to controlling said imaging device;
- providing said imaging device with advanced light metering capabilities chosen from among the group comprising spot metering, average metering, and center-weighted average metering;
- capturing an image of said external surface with said imaging device;
- inputting said image to said computer processor;
- identifying with said computer processor a state of said image;
- analyzing said image state with a rules engine executing on said computer processor;
- determining with said computer processor if said image state indicates that said vehicle is in violation of a condition defined by said rules engine;
- if said vehicle is in violation of a respective condition, initiating an appropriate response to said violation;
- said computer processor providing an output corresponding to said image state applies said advanced light metering capabilities directly to raw pixel data before an image file is created; and
- said computer processor providing an output corresponding to said image state.

14. The method of claim 13, wherein the output corresponding to said image state represents the status of said external control surface.

15. The method of claim 14, wherein the status of said external control surface is chosen from the group consisting of on, off, illuminated, not illuminated, deployed, retracted, home position, out of home position, present, not present, damaged, not damaged, moving, and not moving.

16. The method of claim 13, wherein the output corresponding to said image state represents the position of said external control surface as a numeric displacement from a starting position.

* * * * *